(No Model.)
A. KUNKEL.
GAS PRESSURE REGULATOR AND CUT-OFF.
No. 362,894. Patented May 10, 1887.
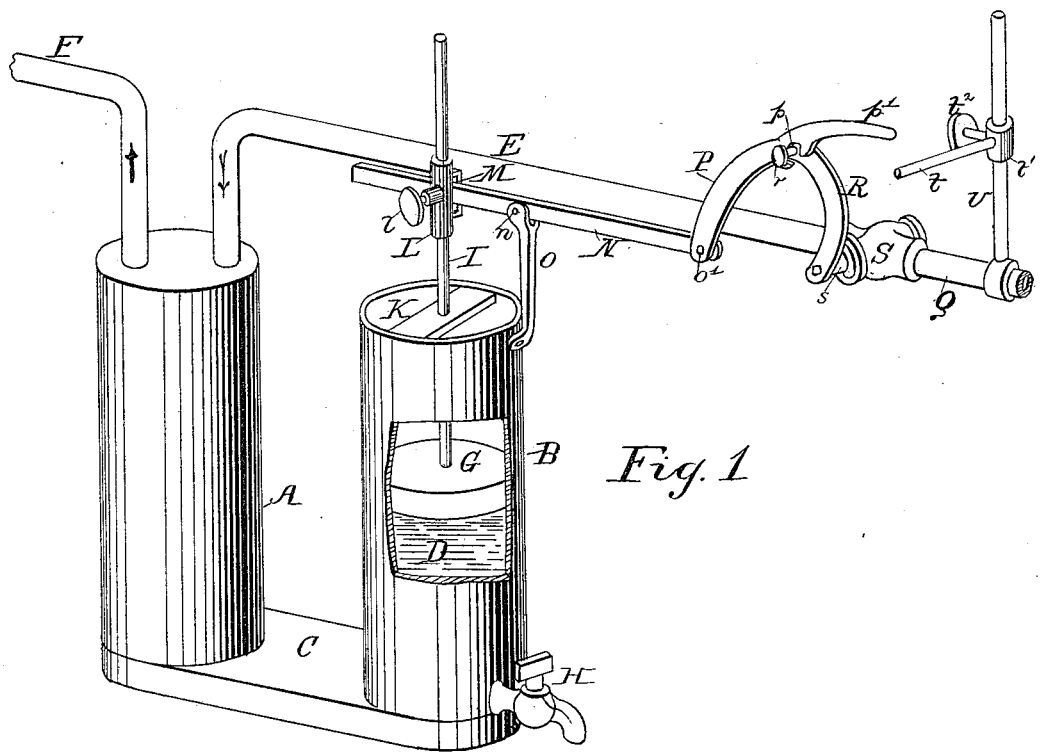
Fig. 1.
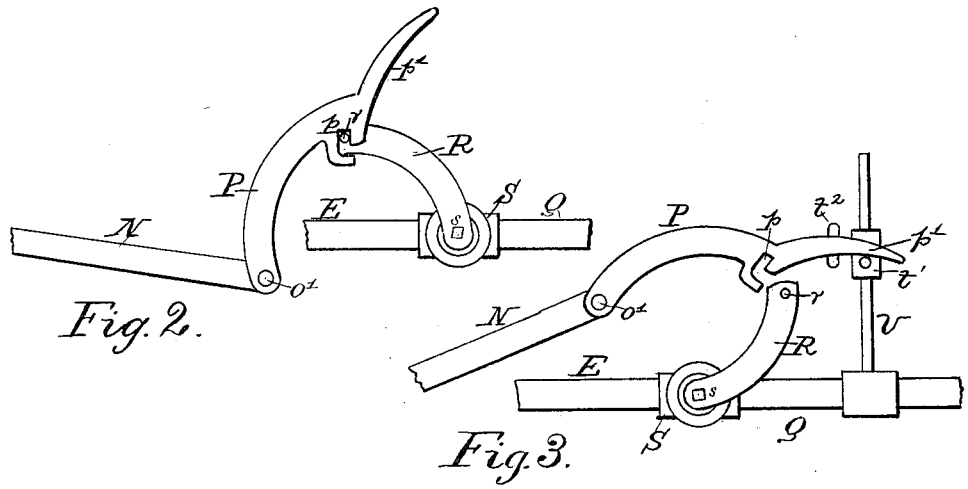
Fig. 2.
Fig. 3.
WITNESSES:
INVENTOR
Adam Kunkel
BY
Connolly Bros,
ATTORNEYS

UNITED STATES PATENT OFFICE.

ADAM KUNKEL, OF PHILLIPSBURG, PENNSYLVANIA, ASSIGNOR OF ONE-HALF TO EDWARD KAYE, OF SAME PLACE.

GAS-PRESSURE REGULATOR AND CUT-OFF.

SPECIFICATION forming part of Letters Patent No. 362,894, dated May 10, 1887.

Application filed February 7, 1887. Serial No. 226,803. (No model.)

*To all whom it may concern:*

Be it known that I, ADAM KUNKEL, a citizen of the United States, residing at Phillipsburg, in the county of Beaver and State of Pennsylvania, have invented certain new and useful Improvements in Pressure-Regulators and Cut-Offs; and I do hereby declare the following to be a full, clear, and exact description of the invention, reference being had to the accompanying drawings, which form part of this specification.

In the distribution of natural gas it is customary to carry the gas in the mains under considerably higher pressure than is safe or desirable in the service-pipes leading to the points of consumption, and to interpose between the mains and service-pipes regulators adapted to reduce the pressure and maintain a constant low pressure in the service-pipes. It has proven extremely difficult to maintain constantly equal pressure in the service-pipes, by reason of the fact that the pressure in the mains continually fluctuates, and the pressure-regulating devices heretofore employed have lacked the sensitiveness necessary to cause them to respond instantly and accurately to any change of pressure in the mains.

As meters are seldom or never used in systems of distributing natural gas for heating or lighting, it is customary to base the charges for consumption upon the number of fires, stoves, burners, &c., in use in each establishment, and as there is no limit whatsoever put upon the amount of gas used the consumption of the same is in most cases extravagant and beyond what necessity requires. For the same reason it may happen that an unscrupulous consumer will, by tapping the service-pipe, supply more fires or burners than his contract with the supplier calls for.

Where gas-pressure regulators as heretofore constructed are in use, it has been observed that when a number of fires or burners are supplied from a service-pipe leading from such regulator, and when one or more of such fires or burners are shut off, the remaining ones receive an overplus of gas and flare or flash up, in some cases continuing to burn with unnecessary violence.

My invention has relation to gas-pressure regulators, and has for its object the provision of means for maintaining a constantly equable pressure in the service-pipes of a gas-distributing system, notwithstanding whatever variation of pressure may occur in the main.

My invention has for its further object the provision of means whereby the flow of gas from the main to the service pipe or pipes will be so governed and regulated that only a certain predetermined maximum amount of gas will be supplied at each fire or burner, whether all or only a portion of such fires or burners be in action.

My invention has for its still further object the provision of means for automatically closing the cock or valve, through the medium of which the flow of gas from the main to the service pipes is governed, and maintaining such cock or valve in its closed condition until manually operated or set again in working order.

My invention consists in the novel construction, combination, and arrangement of parts, hereinafter described, and specifically claimed, the essential features of my invention comprising a chamber, into which leads a pipe from the main, and out of which leads a pipe to the service or delivery pipe, a chamber communicating with the first-named chamber and containing a float, certain suitable rods or levers secured to said float, and a valve or cock, also connected to said rods or levers, the two chambers being supplied with a quantity of liquid, and the variation of pressure of the gas in one chamber operating to raise and lower the float in the other by the variation of level of the liquid upon which such float rests, and by the movement of said float operating the valve or cock connected therewith.

Referring to the accompanying drawings, illustrating my improvements, Figure 1 is a perspective view of the complete apparatus; Figs. 2 and 3, detail views in elevation, showing different positions of the valve-operating levers.

A B designate two separate chambers, the chamber A being closed at top, while the chamber B is open. These two chambers may be arranged in close contact, or may be at any desired distance apart, and communicate at or near their bottoms by a large pipe or tube, sluice, or other suitable passage, C, represented in the drawings as being of rectangular form in cross-section, and of width equal to the full diameter of the compartments A B.

The compartments A B may be constructed as separate and distinct vessels or as divisions of a single vessel, and contain a quantity of water or other liquid, D. The vessel A has a closed top, through which project an inlet-pipe, E, and an outlet-pipe, F, while the vessel B is open at top, contains a float, G, and is provided with a cock or spigot, H, near the bottom, for drawing off the liquid contents of the chambers when desired. The float G has a rod, I, secured on top and projecting a considerable distance above the top of the vessel B, and guided in a cross-piece, K, at top of same. Upon the rod I, and above the cross-piece K, is fitted a collar, L, adapted to slide upon said rod, and held in any desired position by a thumb screw, $l$. Upon one side of collar L is secured a loop or bracket, M, through which passes the free end of a lever pivoted upon a standard, O', at $n$.

A curved lever, P, has one end pivoted at $o'$ to the lever O, and is formed with an annular or "L-shaped" slot, $p$, on its lower edge, which receives a pin, $r$, on the end of a curved lever, R, the other end of which is made fast to the stem $s$ of a cock or valve inclosed in a shell or casing, S, which receives the inlet-pipe E and a pipe, Q, leading from the main. The lever P terminates in a finger, $p'$, and in certain position of the levers, as when in the position shown in Fig. 3, the finger $p'$ contacts with a laterally-projecting arm, $t$, which is adjustably secured by means of a collar, $t'$, and thumbscrew $t^2$, upon an upright, U, and thereby changes the direction of motion of the lever and allows the pin $r$ to drop out of the slot $p$.

Operation: The apparatus being constructed and arranged as shown and described, and the pipe Q being connected to the gas-main and the outlet-pipe F to the service-pipe, a quantity of liquid is put into the chambers A and B. The float G being supported upon top of this liquid, as the latter rises in the chamber B the lever O is raised at its free end and the lever P drawn down. The gas being now turned on from the main and ignited at all the points where it is designed to be used, the maximum amount of gas to be used when all the fires or burners, or both, are burning is determined on, and the height to which the float shall rise and the consequent amount of opening of the valve to give the maximum amount of the gas so to be used is thereupon regulated and determined by adding to or subtracting from the liquid contents of the chambers. At the same time the arm $t$ is fixed in such position upon the standard or upright U that when the valve is opened to its fullest extent any further falling of the float, caused by loss of pressure in the chamber A, will bring the finger $p'$ into contact with arm $t$, and the parts being then in the position shown in Fig. 3, the lever-arm R will drop of its own weight and suddenly and entirely close the valve. If, when the parts are in the position shown in Figs. 1 and 2, the pressure in the main should increase, the additional pressure in the chamber A will cause a fall of the fluid in that chamber and a rise of the fluid in chamber B, thereby raising the float, and through the medium of levers O P turning off the cock S to such an extent as will maintain the supply constant, notwithstanding such increase. If the pressure in the main should decrease, the reverse of the above-described action takes place, and the cock is opened to an extent that will compensate for the decrease in pressure.

In addition to compensating for the variation in pressure in the main, my improved regulator serves also to prevent any of the burners or fires supplied from the service-pipes from consuming more than their proper predetermined amount of gas when any or a number of the other fires or burners are shut off, for if any—as a single fire or burner, or all but one of them—be shut off the gas, having a diminished outlet, will increase the pressure in the chamber A, and will thereupon cause the float to rise and diminish the opening of the cock or valve S.

The working parts of the apparatus, or so much thereof as may be deemed necessary, should be inclosed in a locked box or receptacle, to prevent tampering therewith by unskilled persons, access being possible only by the employés of the supplier. The apparatus described and shown works admirably, even under the most severe test and under all conditions of pressure, the relative adjustment of the float and lever O, by the movement of the collar on the rod, permitting the apparatus to be adjusted in a few seconds to reduce the pressure from the main to any required or desired pressure in the service-pipes. The apparatus is exceedingly sensitive to any variations of pressure in the main, and responds instantly and most delicately to any change whatsoever in the number of burners or fires put into or out of service.

Having fully described my invention, I claim—

1. In a gas-pressure regulator, the combination of two communicating chambers, the one closed and the other open, the former receiving high and low pressure pipes, both chambers containing liquid, with a float supported upon the liquid in the open chamber and suitable rods and levers connecting said float to a cock or valve in the high-pressure pipe, substantially as described.

2. In a gas-pressure regulator, the combination, with two chambers communicating at their lower portions, one open and the other closed, and both containing liquid, and gas-pipes leading into said closed chamber, one from the main, another to the service-pipes, of a float supported upon the liquid in the open chamber and adjustably connected to a cock or valve in the pipe leading from the main, substantially as described.

3. In a gas-pressure regulator, the combination, with an open-mouthed vessel containing a float connected to a gas-cock on a high-pressure pipe leading from a main, of a chamber closed at top, containing liquid, and communicating with the first-named chamber below the level of such liquid and receiving the pipe leading from the main and the pipe leading to the service-pipe above the level of the liquid, substantially as described.

4. In a gas-pressure regulator, the combination, with the closed chamber A, containing a liquid and receiving the pipes E and F, of the chamber B, communicating with the chamber A below the level of the liquid in the same, the float G, the rod I, and the collar L, adjustable on said rod, and levers O P, connecting said rod to a cock or valve on the pipe E, all constructed and arranged substantially as described.

5. In a gas-pressure regulator, the combination, with a float governed in its movements by the variations of the gas-pressure, of a pivoted lever connected to said float, a lever pivotally connected to said first-named lever and formed with an open-ended slot, and a third lever secured to the stem of a valve or cock and provided with a pin adapted to work in said slot, whereby at a certain point in the movement of the float the pin will be automatically disengaged from the slot, thereby closing the cock or valve, substantially as described.

6. In a gas-pressure regulator, the combination, with the chamber A, receiving the pipes E F, the chamber B, communicating with the chamber A, the float G in chamber B, the rod I, and adjustable collar L thereon, of the pivoted lever O, the lever P, pivoted thereto and formed with slot $p$ and finger $p'$, the lever R, attached at one end to the stem of a valve or cock set in pipe E, and having a pin, $r$, at its other end adapted to enter the slot $p$, and the adjustable stop $t$, all constructed and arranged substantially as described.

In testimony that I claim the foregoing I have hereunto set my hand this 5th day of February, 1887.

ADAM KUNKEL.

Witnesses:
M. F. MECKLEM,
JAS. A. NELSON.